United States Patent [19]

Miyagi et al.

[11] 4,110,979
[45] Sep. 5, 1978

[54] APPARATUS FOR INTRODUCING SECONDARY AIR INTO AN EXHAUST SYSTEM OF AN INTERNAL COMBUSTION ENGINE

[75] Inventors: Hideo Miyagi; Kiyohiko Oishi; Yasuhiko Ishida, all of Susono; Shunzo Yamaguchi, Okazaki, all of Japan

[73] Assignees: Toyota Jidosha Kogyo Kabushiki Kaisha, Toyota; Nippon Soken, Inc., Nishio, both of Japan

[21] Appl. No.: 746,869

[22] Filed: Dec. 2, 1976

[30] Foreign Application Priority Data

Aug. 17, 1976 [JP] Japan .................................. 51-97424

[51] Int. Cl.$^2$ ............................................. F01N 3/10
[52] U.S. Cl. ......................................... 60/276; 60/289
[58] Field of Search ................. 60/276, 289, 290, 285

[56] References Cited

U.S. PATENT DOCUMENTS

| 3,086,353 | 4/1963 | Ridgway | 60/285 |
| 3,921,396 | 11/1975 | Nohira | 60/290 |
| 3,931,710 | 1/1976 | Hartel | 60/276 |
| 3,945,205 | 3/1976 | Atago | 60/290 |
| 3,962,867 | 6/1976 | Ikeura | 60/290 |

Primary Examiner—Douglas Hart
Attorney, Agent, or Firm—Stevens, Davis, Miller & Mosher

[57] ABSTRACT

An apparatus for introducing secondary air into an exhaust system of an internal combustion engine, provided with a three-way catalytic converter in the exhaust system. The apparatus includes a first air flow control valve adapted for controlling the amount of air introduced into the exhaust system in accordance with the atmosphere of the exhaust gas so as to cause it to be kept near stoichiometric atmosphere, and a second air flow control valve adapted for preliminarily controlling the amount of secondary air introduced into said first air flow control valve in accordance with the amount of engine fluid passing through the intake system or exhaust system. The atmosphere control operation by the first air flow control valve is effectively promoted by the second air flow control valve, so that atmosphere of the exhaust gas can be strictly and precisely controlled to said stoichiometric atmosphere for proper operation of the three-way catalytic converter.

8 Claims, 15 Drawing Figures

APPARATUS FOR INTRODUCING SECONDARY AIR INTO AN EXHAUST SYSTEM OF AN INTERNAL COMBUSTION ENGINE

FIELD OF THE INVENTION

The present invention related to an apparatus for introducing secondary air into an exhaust system of an internal combustion engine provided with a three-way catalytic converter arranged in the exhaust system of the engine.

BACKGROUND OF THE INVENTION

Already known is a three-way catalytic converter, by which three major toxic components (HC, CO and $NO_x$) in the gas exhausted from an internal combustion engine can be eliminated. The operation of this known three-way catalytic converter is effectively attained when an atmosphere of the exhaust gas introduced into the converter is controlled near stoichiometric atmosphere in which excess air or excess fuel is not substantially left in the exhaust gas, i.e., wherein the excess air ratio λ of the exhaust gas is kept near 1.0.

However, it is impossible to keep the λ near 1.0 in the known carburetor type internal combustion engine; therefore, an effective operation of the three-way catalytic converter is not expected.

Therefore, various types of apparatus have been heretofore proposed for introducing an amount of secondary air into the exhaust pipe of the engine from an air source (for example, an air pump). In these known apparatus, the amount of air introduced into the exhaust pipe is controlled, by a single air flow control valve operated by electric signals from a λ sensor arranged in the exhaust pipe, in such a manner that the amount of air is increased when λ < 1.0 (in other words, when an excess of fuel remains in the exhaust gas), and the amount of air is decreased when λ > 1.0 (in other words, when an excess of air remains in the exhaust gas). As a result of this, controlling the atmosphere of the exhaust gas to the stoichiometric atmosphere (in which λ = 1.0) can be expected.

However, in these known apparatus, a precise control of the atmosphere cannot be fully expected. This is because, the amount of air introduced into the valve from the air pump, which is directly connected to the air flow control valve, is independent of the amount of secondary air which should be introduced into the exhaust pipe from the valve. Because there is no relation between the amount of air which is introduced into the air flow control valve and the amount of air which is discharged from the valve, an effective atmospheric control operation cannot be expected to be performed by the valve.

SUMMARY OF THE INVENTION

An object of the invention is to provide an apparatus for introducing secondary air into the exhaust system of an internal combustion engine, adapted for controlling the amount of secondary air in such a manner that the λ is precisely controlled near 1.0 for the effective operation of the three-way catalytic converter.

Another object of the invention is to provide such an apparatus including a supplementary air flow control valve which is arranged between the air pump and a main air flow control valve connected to the exhaust system and which is adapted for preliminarily controlling the amount of air introduced into the main air flow control valve.

According to the invention, an apparatus for introducing secondary air into an exhaust system of an internal combustion engine provided with a three-way catalytic converter arranged in said exhaust system is provided, said apparatus comprising:

pipe means connected to the exhaust system at a position located upstream of said three-way catalytic converter;

air introducing means provided on said pipe means for introducing air into the pipe means;

means for sensing an atmosphere of the exhaust gas arranged in said exhaust system in order to provide electrical signals indicating the excess air ratio λ of the exhaust gas in the exhaust system;

first air flow control valve means having a casing arranged on said pipe means and having a valve member in said casing, the valve member being moved so as to control the amount of secondary air passed through the casing;

actuating means of said firsst air control valve means connected to said sensing means for moving said valve member in accordance with the electrical signals indicating the excess air ratio λ of the exhaust gas so as to introduce a necessary amount of secondary air into the exhaust system so that the atmosphere of the exhaust gas is controlled to a stoichiometric atmosphere in which λ is kept near 1.0;

second air flow control valve means having a casing arranged in said pipe means at a position located upstream of said first air flow control valve means remote from the exhaust system, and having a valve member which is capable of being moved so as the control the amount of secondary air introduced into said first air flow control valve means, and;

operating means of said valve member of said second air flow control valve means to move said valve member thereof for controlling the amount of secondary air introduced into the exhaust system in accordance with the amount of engine fluid passed through the engine passageway, including the intake system and the exhaust system so that the ratio of the amount of air introduced into the first valve to the amount of air introduced into the engine exhaust system is kept approximately near to a predetermined value which is larger than 1.0.

Due to this preliminary control of the amount of air by the supplementary valve a precise control of the atmosphere of the exhaust gas to said stoichiometric atmosphere by the first air flow control valve means is effectively attained.

DESCRIPTION OF A PREFERRED EMBODIMENT

Figure 1:
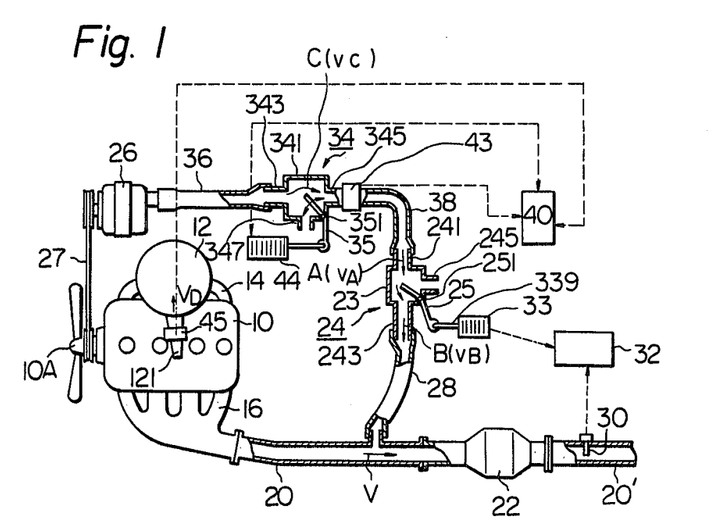
FIG. 1 is a schematic representation of a first embodiment of the present invention.

Referring to FIG. 1 showing a first embodiment according to the present invention, numeral 10 designates an engine body of an internal combustion engine. An air cleaner 12 is connected to an intake manifold 14 through a not shown carburetor in order to supply air-fuel mixture into combustion chambers (not shown) in the engine body 10. Connected to the combustion chambers is an exhaust manifold 16 for receiving resultant exhaust gas. The exhaust gas is introduced into a three-way catalytic converter 22 arranged between exhaust pipes 20 and 20' for cleaning three major toxic components CO, HC and $NO_x$ remaining in the exhaust gas.

Numeral 24 designates a main flow control valve adapted for controlling the amount of secondary air introduced into the exhaust pipe 20, in such a manner that the atmosphere of the exhaust gas directed to the three-way catalytic converter 22 is controlled to a stoichiometric atmosphere in which the so-called excess air ratio $\lambda$ is kept near 1.0. The valve 24 has a casing 23 provided with an inlet 241, a first outlet 243 and a second outlet 235. The valve 24 also has a valve member 25 arranged in the casing 23 and capable of being pivoted about a pin 251. The first output 243 of the main valve 24 is connected to the exhaust pipe 20 at a position located upstream of the catalytic converter 22, whereas the second outlet 245 is opened to the atmosphere for discharging the extra amount of air. To the inlet 241 of the valve 24, air from an air pump 26 driven by a crankshaft 10A of the engine 10 via a belt 27, is introduced as shown by an arrow A.

Figure 2:
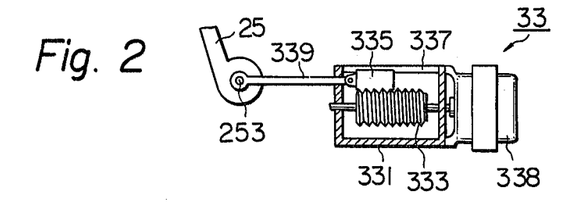
FIG. 2 is a longitudinal sectional view of the actuator of the main air flow control valve in FIG. 1.

The valve member 25 is connected to an actuator 33 for moving the valve member 25 so that it pivots in a clockwise direction about the pin 251 for increasing the amount of air $V_B$ passed through the valve 24 toward the exhaust pipe 20, as shown by an arrow B, or in a counterclockwise direction for decreasing said amount $V_B$. The actuator 33, as shown in FIG. 2, has a housing 331 and a worm wheel 333 rotatably mounted in the housing 331. A rack 335 which engages with the wheel 333 is slidably accommodated in a guide groove 337 formed on the inner surface of the housing 331. A rod 339 one end of which is pivoted to the rack 335 extends out of the housing 331. Another end of the rod 339 is pivoted to one end of the valve member 25 about a pin 253. The worm wheel 333 is connected to an electric motor 338 mounted on the housing 331.

As a result of this arrangement, when the electric motor 338 is rotated to rotate the worm wheel 333, the rack 335 is rectilinearly moved along the guide groove 337 in the right-hand or left-hand direction according to the direction of the rotation of the electric motor of 338. Due to the rectilinear movement of the rod 339, pivotal movement of the valve member 25 about the pin 251 (FIG. 1) in the clockwise direction or counterclockwise direction occurs. This pivotal movement of the valve member 25 is effected at a slow speed because the worm wheel 333 and the rack 335 engaging with the worm wheel 333 are used.

Figure 3:
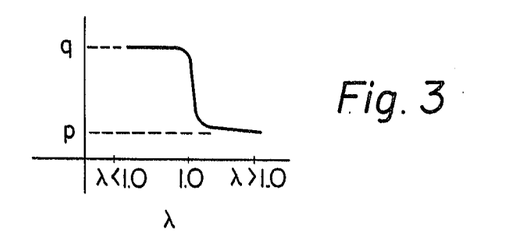
FIG. 3 is a characteristic curve of the λ sensor in FIG. 1.

The electric motor 338 (FIG. 2) of the actuator 33 (FIG. 1) is driven by electrical signals from the $\lambda$ sensor 30, in order to increase or decrease the amount of air $V_B$ introduced into the exhaust pipe 20 in accordance with the excess air ratio $\lambda$ of the exhaust gas. To this end, the electric motor 338 is connected, through a control unit 32, to the $\lambda$ sensor 30 which is located downstream or the catalytic converter 22. The $\lambda$ sensor 30 projects into a passageway formed in the exhaust pipe 20' for sensing the atmosphere of the exhaust gas. The $\lambda$ sensor 30, which is already known, operate to provide electrical signals of both low and high voltages, as shown in FIG. 3. The first signal of a low voltage level P indicates that an excess amount of air remains in the exhaust gas, in other words, $\lambda > 1.0$. The second signal of a high voltage level q indicates that an excess amount of fuel remains in the exhaust gas, in other words, $\lambda < 1.0$.

Figure 4:
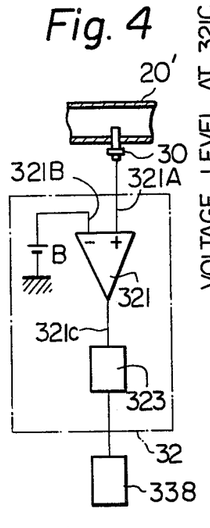
FIG. 4 is a diagrammatic view of the control unit for the main air flow control valve in FIG. 1.

The control unit 32 has, a shown in FIG. 4, a comparator unit 321 including an input 321A connected to the $\lambda$ sensor 30, another input 321B connected to a battery B, and an output 321C. The comparator unit 321 operates to provide, at the output 321C, a signal of a positive level when the voltage level at the input 321A is higher than the input level at the input 321B, and to privide a signal of a negative level when the input level at the input 321A is lower than the input level at the input 321B. The input level at the input 321B due to the battery B is adjusted so that it is between the voltage levels P and q (FIG. 3). Therefore, the comparator unti 321 provides the signals R of a positive level r (FIG. 4a) at the output 321C when $\lambda < 1.0$, while providing the signals S of a negative level-s, when $\lambda > 1.0$. These signals of a positive or a negative level are transmitted to the motor 338 (FIG. 4) via an amplifier unit 323. The motor 338 is rotated so that the rack 335 is slowly moved in the left-hand direction of FIG. 2 so as to cause a pivotal movement of slow speed of the valve member 25 in the clockwise direction in FIG. 1 for gradually increasing the amount of air $V_B$ being passed through the valve 24 as shown by a line $l_1$ in FIG. 4a, when the positive signal R is received by the motor 338. Whereas the motor 338 is rotated so that the rack 335 is slowly moved in the right-hand direction of FIG. 3, so as to cause a pivotal movement of slow speed of the valve member 25 in the counterclockwise direction about the pin 251 for gradually decreasing said amount of air $V_B$, as shown by a line $l_2$ in FIG. 4a, when the negative signal S are received by the motor 338.

Figure 4A:
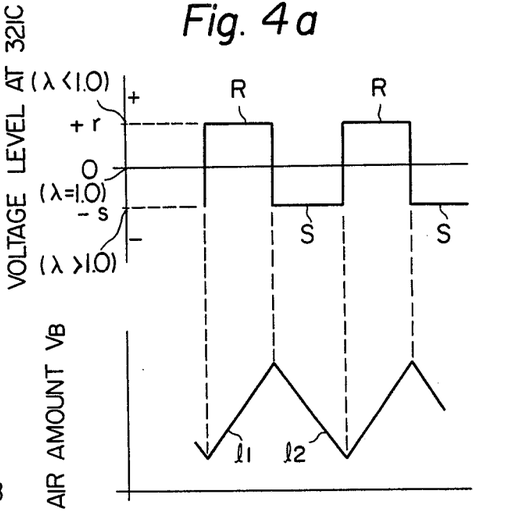
FIG. 4a presents graphs showing the operation of the main valve in FIG. 4.

As a result of the movement of slow speed of the valve member 25 in the clockwise direction when $\lambda < 1.0$ or in the counterclockwise direction when $\lambda > 1.0$, the amount of air $V_B$ introduced into exhaust pipe 20 can be increased or decreased at a controlled rate, as shown by line $l_1$ or $l_2$ in FIG. 4a; therefore, control of the atmosphere of the exhaust gas toward the stoichimetric atmosphere in which λ = 1.0 can be attained.

In the above-mentioned arrangement as seen in FIG. 1, if the air pump 26 is directly connected to the inlet 241 of the flow control valve 24, an idealized atmosphere controlling operation by the valve 24, the actuator 33, the control unit 32 and the λ sensor 30 cannot be expected, due to the fact that said amount $V_B$ which should be introduced into the exhaust pipe 20 is independent of the amount of air $V_A$ which is introduced into the valve 24 from the air pump 26. This is because, (1) on the one hand, said amount $V_B$ is approximately proportional to the amount V of the exhaust gas passed through the exhaust pipe 20 (or the amount of intake air $V_D$ passed through the intake system), (2) on the other hand, said amount of air $V_A$ from the air pump is not proportional to said amount V. (The amount of air $V_A$ is proportional to the engine rotational speed because the air pump 26 is connected to the crankshaft 10A of the engine.) Therefore, it becomes difficult to control the amount of air $V_B$ so that the atmosphere of the exhaust gas is precisely controlled to the stoichiometric atmosphere.

To remedy this difficult, according to the invention, a supplementary flow control valve 34 is arranged between the air pump 26 and the main flow control valve 24, in order to preliminarily control the amount of air $V_A$ introduced into the main flow control valve, is such a manner that the ratio of said amount $V_A$ to the amount $V_B$ is kept approximately near to a predetermined value which is larger than 1.0. The supplementary valve 34 has a casing 341 provided with an inlet 343 and a first outlet 345 and a second outlet 347, and a valve member 35 arranged in the casing 341 and capable of rotating about a pin 351. The outlet 345 is connected to the main flow control valve 24 through a first air flow sensor 43 which will be fully described later and a pipe 38 connected to the inlet 241 of the valve 24. The outlet 347 is opened to the atmosphere for discharging the extra amount of air. The inlet 343 is connected to the air pump 26 through a pipe 36 for introducing air into the supplementary air flow control valve 34.

According to the invention, the valve member 35 of the supplementary air flow control valve 34 is operated to introduce an amount of air into the main valve 24, so that the ratio of the amount $V_A$ to the amount of air $V_B$, which is the amount required for being introduced into the exhaust pipe 20, is kept approximately near to said predetermined value which is larger than 1.0. This operation is carried out by an actuator 44 of the valve member 35; a first air flow sensor 43 arranged between the supplementary flow control valve 34 and the main control valve 24 for detecting the amount of air $V_A$ introduced into the main valve 24; a second air flow sensor 45 arranged in an input mouth 121 of the air cleaner 12 for detecting the amount of intake air $V_D$; and an operating unit 40 for driving the actuator 44 in accordance with signals from the air flow sensors 43 and 45.

The valve member 35 is connected to the actuator 44 for moving the valve member 25 so that it pivots in a clockwise direction about the pin 351 for decreasing the amount of air $V_C$ passed through the supplementary air flow control valve 34 as shown by an arrow C toward the main air flow control valve 24, or in a counterclockwise direction for increasing said amount $V_C$. The actuator 44, which has substantially the some construction as the actuator 33 (FIG. 2) includes a motor 441 (FIG. 6) and a gear mechanism (not shown). The gear mechanism causes a pivotal movement at a slow speed of the valve member 35 in the clockwise direction about the pin 351 to decrease the amount of air $V_C$ when a positive electrical input signal is received by the motor 441, or in the counterclockwise direction to increase the amount of air $V_C$ when a negative electrical input signal is received by the motor 441.

Figure 5:
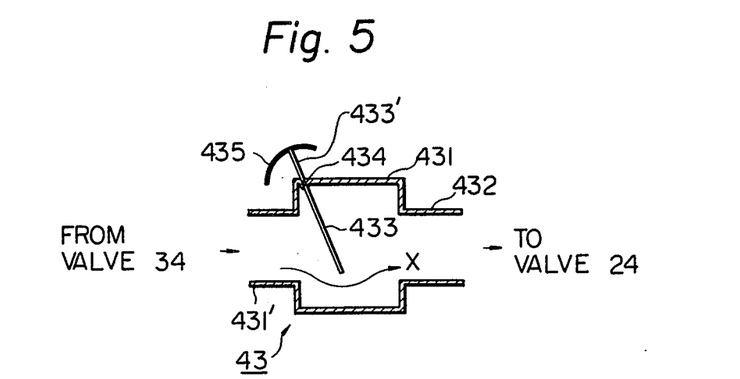
FIG. 5 is a sectional view of the first air flow sensor in FIG. 1.
Figure 6:
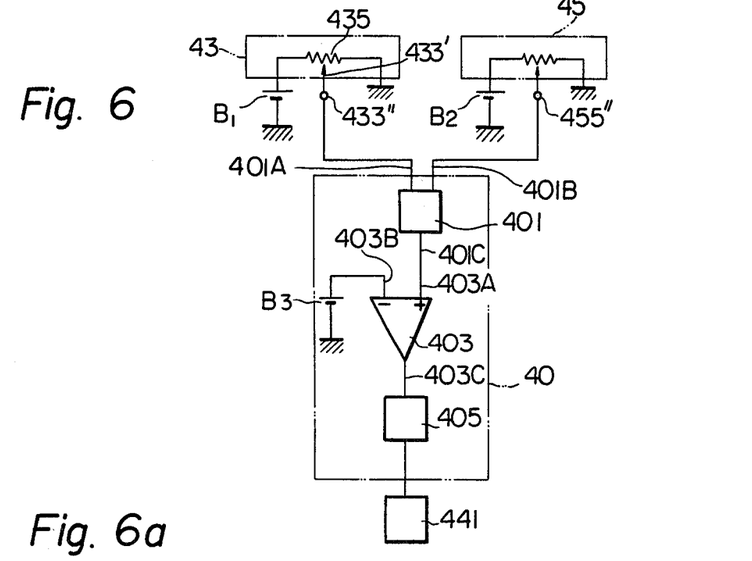
FIG. 6 is a diagrammatic view of the control unit for the supplementary flow control valve in FIG. 1.

The first air flow sensor 43 adapted for detecting the amount of air $V_A$ introduced into the main air flow control valve 24 from the supplementary air flow control valve 34, has as shown by FIG. 5, a case 431 having an inlet 431' connected to the supplementary air flow control valve 34 and an outlet 432 connected to the main air flow control valve 24. A plate element 433 is arranged in the case 431 to pivot about a pin 434 so that the angular position of the plate element 433 is varied in accordance with the amount of air being passed through the case 431 as shown by an arrow X. A stationary member 435 of an arc shape is provided so that an outer end portion 433' of the plate element 433 is always in contact with the stationary member 435 during the pivotal movement of the plate element 433. The arc-shaped stationary member 435 is made of an electrical resistant material, where as the outer end portion 433' is made of a metallic material. Therefore, if a battery $B_1$ is used as shown in FIG. 6, electrical signals indicating the angular position of the portion 433', in other words, indicating the amount of air passing through the first air flow sensor 43 as shown by the arrow X, are obtained from the member 433 which is composed an output terminal 433" of the first air flow sensor 43.

The second air flow sensor 45 arranged in the input mouth 121 (FIG. 1) of the air cleaner 12 (FIG. 1) has substantially the same construction as that of the first air flow sensor 43. Therefore, if a battery $B_2$ is used, as shown in FIG. 6, electrical signals indicating the amount of air $V_D$ passing through the air cleaner 12 are obtained from an output terminal 455" of the second air flow sensor 45.

Figure 6A:
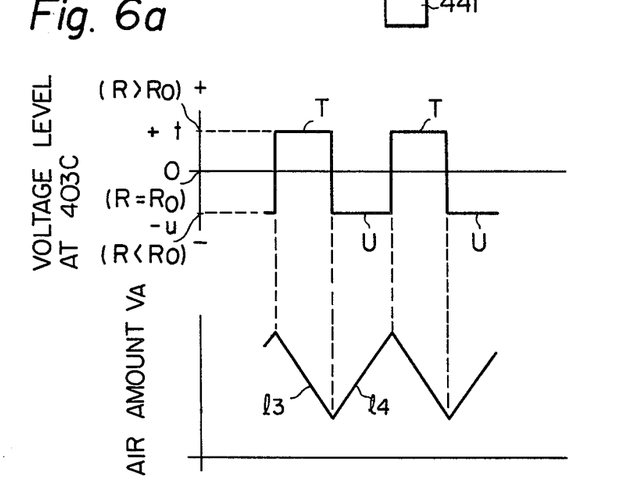
FIG. 6a presents graphs showing the operation of the supplementary air flow control valve in FIG. 6.

The operating unit 40 has a divider unit 401 having an input 401A connected to the output terminal 433" of the first air flow sensor 43 and another input 401B connected to the output terminal 455" to the second air flow sensor 45. The divider unit 401 operates to provide signals at an output 401C, indicating the ratio of a voltage level at the second input 401B to the voltage level at the first input 401A. As previously mentioned, the voltage level at the second input 401B corresponds to the amount of the intake air $V_D$ passed through the second air flow sensor 45 toward the engine combustion chambers, and the voltage level at the first input 401A corresponds to the amount of air $V_A$ passed through the first air flow sensor 43 toward the main flow control valve 24. Therefore, the voltage level at the output 401C becomes correspondent to a ratio R of the amount of intake air $V_D$ to said secondary air amount $V_A$. Connected to the divider unit 401 is a comparator unit 403 having an input 403A connected to the output 401C and another input 403B connected to the battery $B_3$. The comparator unit 403 operates to provide, at an output 403C thereof, a signal of a constant positive level when the voltage level at the input 403A is higher than the voltage level at the input 403B, and to provide a signal of a constant negative level when the voltage level at the input 403A is lower than the voltage level at the input 403B. The voltage level at the input 403B due to the battery $B_3$ is so adjusted that the voltage level corresponding to a predetermined constant ratio $R_O$ of said intake air amount $V_D$ to said the secondary air amount $V_B$. Therefore, the comparator unit 403 provides the signals T of a positive voltage level t when the ratio R is larger than said predetermined constant ratio $R_O$ as shown in FIG. 6a, while providing signals U of a negative voltage level $-u$ when said detected ratio is smaller than said predetermined ratio $R_O$ (FIG. 6a). These signals of a positive or negative level thus obtained are transmitted to a motor 441 of the actuator 44 (FIG. 1) through the amplifier unit 405 (FIG. 6). Thus a pivotal movement at a slow speed of the valve member 35 of the supplementary flow control valve 34 is effected in the clockwise direction when said signal T of the positive level t is received by the motor 441 for gradually decreasing the amount of air $V_A$ (as shown by a line $l_3$ in FIG. 6a) passed through the supplementary air flow control valve 34 toward the main valve 24 due to the the ratio R being larger than said predetermined ratio $R_O$. Whereas a pivotal movment of a controlled slow speed of the valve member 35 is effected in the counterclockwise direction when said signal U of the negative level $-u$ is received by the motor 441 for gradually increasing the amount of secondary air $V_A$ (as shown by a line $l_4$ in FIG. 6a) passed through the supplementary air flow control valve 34 toward the main control valve 24 due to the fact that the detected ratio R is larger than said predetermined ratio $R_O$. Therefore, the ratio R of the intake air amount $V_D$ passes through the air cleaner 12 to the amount $V_A$ of secondary air introduced into the main valve 24 is controlled to said predetermined constant ratio $R_O$. This causes the amount of air $V_A$ (FIG. 1) introduced into the main control valve 24 to always be controlled so that the ratio of the amount $V_A$ to the amount $V_B$ is kept approximately near to the predetermined valve which is larger than 1.0 because the amount of air ($V_B$) approximately corresponds to the amount of intake air $V_D$ passed through the air cleaner 12, in other words, the amount of exhaust gas V passed through the exhaust pipe 20. Thus, an ideal atmospheric control operation by the main flow control valve 24, the actuator 33, the control unit 32 and the λ sensor 30 can be performed, so as to cause the atmosphere of the exhaust gas to be precisely controlled to a stoichiometric atmosphere in which λ = 1.0. Therefore, a strictly effective exhaust gas cleaning operation by the three-way catalytic converter 22 can be obtained.

Figure 7:
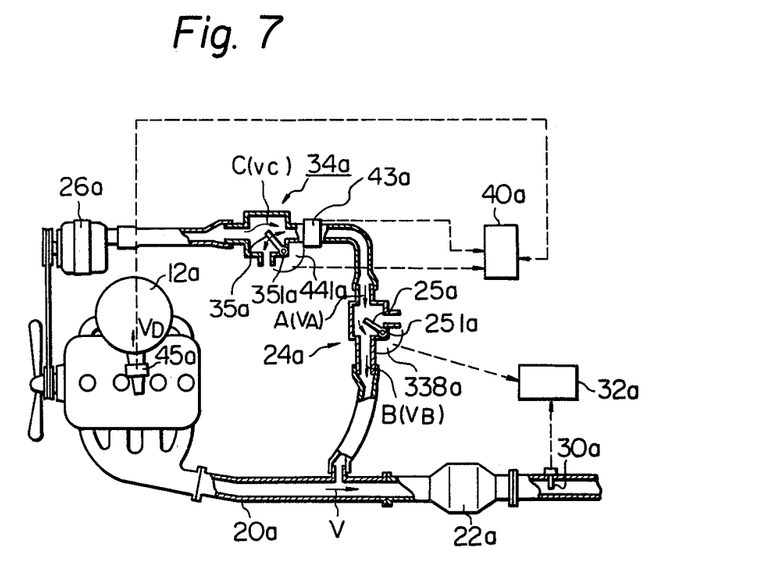
FIG. 7 is a schematic representation of a second embodiment of the present invention.
Figure 8:
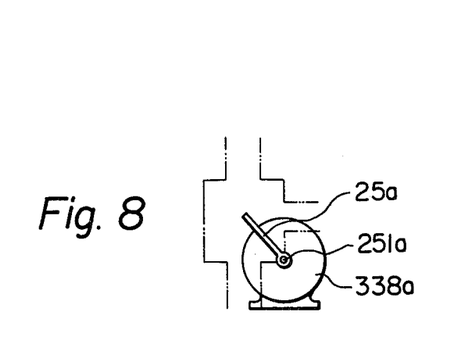
FIG. 8 is a schematic elevational view of a drive motor for the main air flow control valve in FIG. 7.
Figure 9:
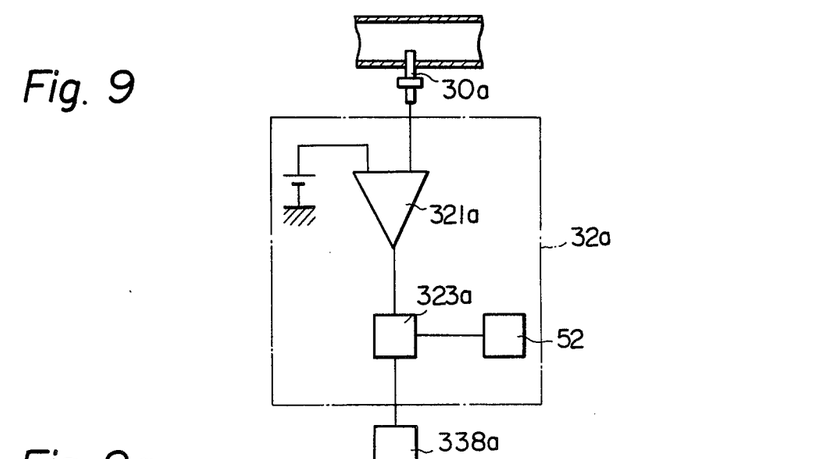
FIG. 9 is a diagrammatic view of the control unit for the main air flow control valve in FIG. 7.

FIG. 7 shows the construction of a second embodiment according to the invention. In this embodiment, a main air flow control valve 24a adapted for controlling the amount of secondary air introduced into the exhaust manifold 16a from an air pump 26a is also provided. The valve 24a has a valve member 25a capable of being rotated by a drive pin 251a secured to the member 25a for controlling the amount of air $V_B$ passed through the valve 24a toward the exhaust pipe 20a as shown by an arrow B. As shown in FIG. 8, the drive pin 251a o the valve member 25a in this embodiment is directly connected to an output shaft of a step motor 338a for rotating the valve member 25a in a clockwise direction or in a counterclockwise direction in accordance with signals sent from a control unit 32a (FIG. 7). The control unit 32a (FIG. 9), which is also connected to a λ sensor 30a for providing electric signals indicating the atmosphere of the exhaust gas in the exhaust pipe 20a as shown by FIG. 3, has substantially the same construction as the construction of FIG. 4, except that a pulse generating unit 52 is connected to a modulated amplifier unit 323a for providing a first pulsating signal R' of a positive level r' of a predetermined frequency (FIG. 9a) at the output of the unit 323a indicating that the excess air ratio λ in larger than 1.0, and a second pulsating signal S' of a negative level $-s'$ of a predetermined frequency (FIG. 9a) at the output of the unit 323a indicating that the excess air ratio λ is smaller than 1.0, which signals R' and S' are transmitted to the pulse motor 338a (shown in FIG. 8). Said motor 338a is rotated in the clockwise direction through an angle determined by the number of pulses contained in the signal R'. The motor 338a is rotated in the counterclockwise direction through an angle determined by a number of pulses contained in the signal S', as seen in FIG. 9a.

Figure 9A:
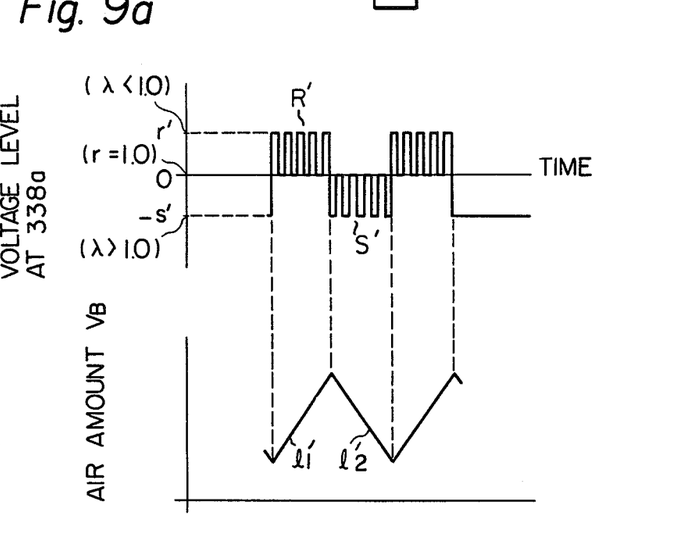
FIG. 9a presents graphs showing the operation of the main valve in FIG. 9.

As a result, a rotational movement at a slow speed of the valve member 25a connected to the motor 338a in the clockwise direction is carried out for gradually increasing the amount of secondary air $V_B$ introduced into the exhaust pipe 20a, shown by a line $l_1'$ in FIG. 9a when a signal R' indicating λ < 1.0 is being transmitted from the λ sensor 30a, whereas a rotational movement at a slow speed in the counterclockwise direction is carried out for gradually decreasing the amount $V_B$ of the secondary air as shown by a line $l_2'$ in FIG. 9a when the signal S' indicating λ > 1.0 is being transmitted from the λ sensor 30a. As a result, a control of the atmosphere of the exhaust gas toward λ = 1.0 can be expected.

In the embodiment shown in FIG. 7, a supplementary air flow control valve 34a is also provided for preliminarily controlling the amount $V_A$ of secondary air introduced into the main air flow control valve 24a. The supplementary air flow control valve 34a has a valve member 35a capable of being rotated about a drive pin 351a secured to the member 35a, for controlling the amount $V_A$ of the secondary air passed through the supplementary air flow control valve 34a toward the main air flow control valve 24a. The drive pin 351a is directly connected to an output shaft of a pulse motor 441a for driving the valve member 35a.

An air flow sensor 43a, which has a construction substantially the same as that of the first air flow sensor 43 in FIG. 5, is provided between the valves 24a and 34a for detecting an amount of air $V_A$ introduced into the main air flow control valve 24a as shown by an arrow A.

A second air flow sensor 45a which has construction substantially the same as that of the air flow sensor 43a is provided in the air cleaner 12a.

Figure 10:
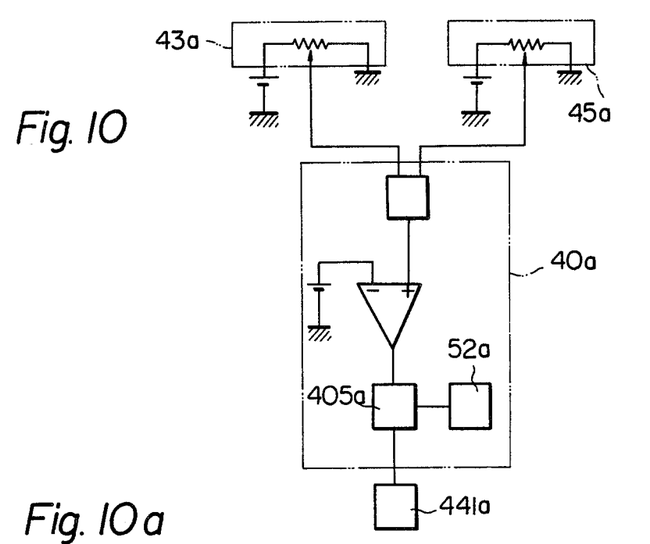
FIG. 10 is a diagrammatic view of the control unit for the supplementary flow control valve in FIG. 7.

The control unit 40a connected to the sensors 43a and 45a, as shown in FIG. 10, has substantially the same construction as that of FIG. 6, except that a pulse generating unit 52a is connected to a modulated amplifier unit 405a, for providing a first pulsating signal T' of a positive level t' of a predetermined frequency at the output of the modulated amplifier unit 405a indicating that the ratio R of the amount of intake air $V_D$ passed through the air cleaner 12a to the amount of secondary air $V_A$ introduced into the main air flow control valve 24a is larger than a predetermined ratio $R_o$, and for providing a second pulsating signal U of a negative level $-u'$ of a predetermined frequency indicating that the ratio R is lower than the predetermined ratio $R_o$. These signals T' and U' are transmitted to the pulse motor 441a which is rotated in the counterclockwise direction through an angle determined by a number of the pulses in the signal T' and which is also rotated in the clockwise direction through an angle determined by the number of pulses in the signal U'.

Figure 10A:
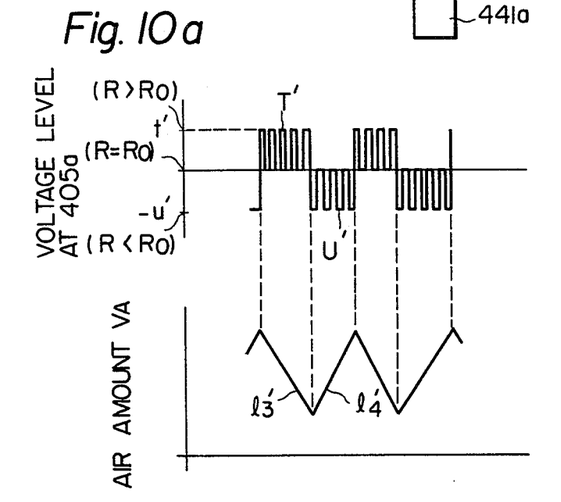
FIG. 10a presents graphs showing the operation of the supplementary valve in FIG. 10.

As a result, a rotational movement at a slow speed of the valve member 35a connected to the motor 441a in the counterclockwise direction is carried out for gradually increasing the amount of secondary air $V_A$ as shown by line $l_4'$ in FIG. 10a when the ratio R is lower than said predetermined ratio $R_o$, whereas a rotational movement at a slow speed of the valve member 35a in a clockwise direction is carried out for gradually decreasing the amount of secondary air $V_A$ as shown by line $l_3'$ in FIG. 10a when the ratio R is smaller than said predetermined ratio $R_o$. Thus, the ratio $R$ ($=V_D/V_B$) is controlled to said predetermined ratio $R_o$, thereby causing the amount of air $V_A$ to always be controlled so that the ratio of the amount $V_A$ to the amount $V_B$ is kept approximately near the predetermined value which is larger than 1.0, because the amount $V_B$ approximately corresponds to the amount of intake air $V_D$. Consequently, an ideal atmospheric control operation by the main air flow control valve 24a can be performed for precisely controlling the atmosphere of the exhaust gas to correspond with the stoichiometric atmosphere in which $\lambda = 1.0$, thus obtaining an effective operation of the three-way catalytic converter 22a.

Figure 11:
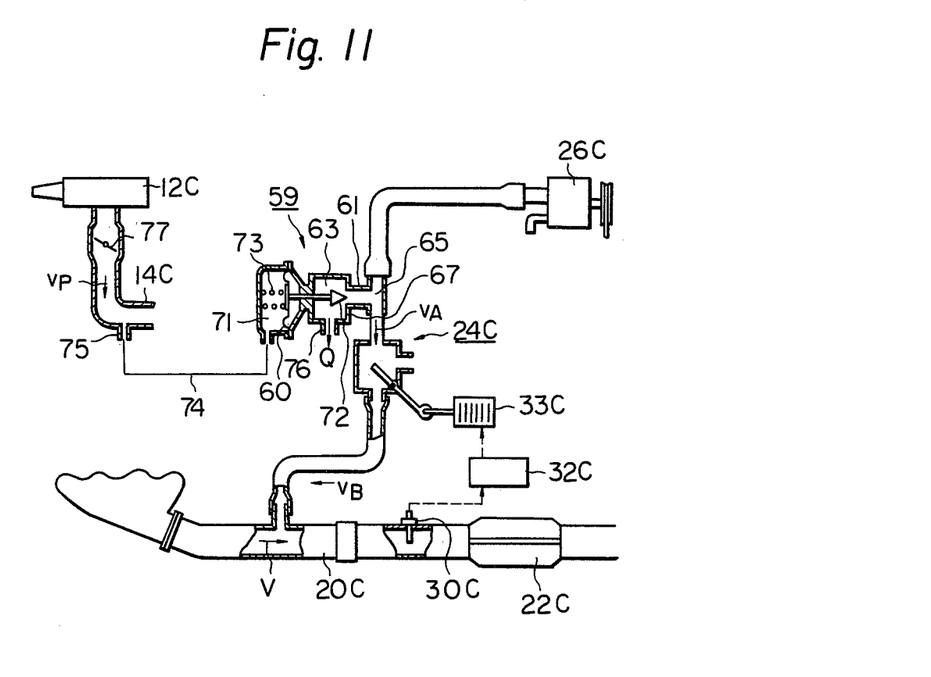
FIG. 11 is a schematic representation of the third embodiment of the present invention.

In FIG. 11 showing another embodiment of the present invention, a supplementary air flow control valve 59 which is substantially different from the valve 34 show in FIG. 1 is disclosed. A main valve 24c has substantially the same construction as that of valve 24 in FIG. 1. This valve 24c is operated by an actuator 33c, a control unit 32c, and $\lambda$ sensor 30c, in a process already explained hereinbefore with respect to FIG. 1.

The supplementary air flow control valve 59 has a body 61 which has a chamber communicating with a passage 65 between an air pump 26c and the main air flow control valve 24c through a valve seat 67. The chamber 63 also has a port 76 opened to the atmosphere for discharging an excess amount of air. A valve member 72 arranged in the chamber 63 so as to face the valve seat 67 is connected to a vacuum operated mechanism having a diaphragm 60. A vacuum chamber 71 is formed on one side of the diaphragm 60 remote from the valve member 72. A spring 73 is arranged in the vacuum chamber 71 for urging the valve member 72 toward the valve seat 67. The vacuum chamber 71 is connected, through a vacuum pipe 74, to a vacuum port 75 formed in an intake manifold 14c downstream of a throttle valve 77, located downstream of a air cleaner 12c.

In the operation of this embodiment when the amount of exhaust gas V is small due to the small amount of intake air $V_P$ passing through the intake manifold 14c, the vacuum level at the vacuum port 75 becomes relatively high because the opening of the throttle valve 77 remains small due to said small amount of the intake air $V_O$. As a result of the above condition, the diaphragm 60 is displaced against the spring 73, so as to cause the valve member 72 to be moved away from the valve seat 61, allowing the amount of air discharged from the port 76, as shown by an arrow Q, to be subsequently increased. Consequently, the amount of air $V_A$ introduced into the main valve 24c is decreased so that the ratio R of the amount of the intake air $V_P$ to the amount of the secondary air $V_B$ introduced into the main valve 24c is controlled to the predetermined constant ratio $R_o$.

When the amount of the exhaust gas V is large due to a large amount of intake air $V_P$ passing through the intake manifold 14c, the vacuum level at the vacuum port 75 becomes relatively low because the opening of the throttle valve 77 remains large due to the large amount of intake air $V_P$. As a result of the above condition, the diaphragm 60 is displaced by the spring 73 so as to cause the valve member 72 to be moved toward the valve seat 67, allowing the amount of the air discharged from the port 76, as shown by the arrow Q, to be decreased. Therefore, the amount of air $V_A$ introduced into the main valve 24c is increased so that the ratio R of the amount $V_D$ to the amount $V_A$ is controlled to the predetermined constant ratio $R_o$.

As a result of this controlling operation of the ratio R to the predetermined ratio $R_o$, the amount of air $V_A$ introduced into the main valve 24c is always under control such that the ratio of the amount $V_A$ to the amount $V_B$ is kept approximately near to a predetermined value which is larger than 1.0. Thus, an ideal atmospheric control operation can be performed by the main flow control valve 24c, the actuator 38c, the control unit 32c and the $\lambda$ sensor 30c, thereby precisely controlling the atmosphere of the exhaust gas to correspond the stoichiometric atmosphere in which $\lambda = 1.0$. Consequently, an effective exhaust gas cleaning operation performed by the three-way catalytic converter 22c can be obtained.

While this invention was described with reference only to the embodiment, however, many modifications and changes can be effected by individuals skilled this art without departing from the scope and spirit of the invention.

What is claimed is:

1. An apparatus for introducing secondary air into an exhaust system of an internal combustion engine provided with a three-way catalytic converter arranged in said exhaust system, said apparatus comprising:

pipe means connected to said exhaust system at a position located upstream of said three-way catalytic converter;

air introducing means provided on said pipe means for introducing air into said pipe means;

means for sensing an atmosphere of said exhaust gas arranged in said exhaust system in order to provide electrical signals indicating an excess air ratio of said exhaust gas in said exhaust system;

first air flow control valve means having a casing arranged on said pipe means and having a valve member disposed in said casing, said valve member being moved so as to control an amount of a secondary air passing through the casing;

actuating means of said first control valve means connected to said sensing means to move said valve member in accordance with said electrical signals indicating said excess air ratio $\lambda$ of said exhaust gas to introduce a necessary amount of secondary air into said exhaust system so that the atmosphere of said exhaust gas is controlled to a stoichiometric atmosphere in which $\lambda$ is kept near 1.0;

second air flow control valve means having a casing arranged in said pipe means at a position located upstream of said first air flow control valve means remote from said exhaust system, and having a valve member which is capable of being moved so as to control the amount of secondary air introduced into said first air flow control valve means, and;

operating means of said valve member of said second air flow control valve means for moving said valve member for controlling the amount of secondary air introduced into said exhaust system in accordance with the amount of fluid passing through the engine passageways including the intake system and said exhaust system, so that the ratio of the amount of the air introduced into said first air flow control valve means to said necessary amount of air introduced into the engine exhaust system is kept approximately near to a predetermined value which is larger than 1.0, whereby a precise control of the atmosphere of the exhaust gas to said stoichiometric atmosphere by said first air flow control valve means is effectively attained.

2. An apparatus for introducing secondary air according to claim 1, wherein said sensing means comprises an electrical unit for providing a first electrical signal indicating that the excess air ratio $\lambda$ is larger than 1.0 and a second electrical signal indicating that the excess air ratio $\lambda$ is smaller than 1.0, said first electrical signal being transmitted to said actuating means in order to move said valve member of said first valve means in one direction to decrease the amount of air introduced into said exhaust system, said second electrical signal being transmitted to said actuating means in order to move said valve member of said first valve means in another direction opposite to said one direction in order to increase the amount of air introduced into the exhaust system.

3. An apparatus for introducing secondary air according to claim 2, wherein said actuating means comprises an electric motor connected to said electrical circuit and a rack and worm wheel mechanism connecting the electric motor to said valve member of said first air flow control valve means, so that said valve member is slowly moved in said one direction for gradually decreasing the amount of air introduced into the exhaust system when said first signal is transmitted into said actuating means, and that the valve member is slowly moved in said other direction for gradually increasing the amount of air introduced into the exhaust system when said second signal is transmitted into said actuating means.

4. An apparatus for introducing secondary air according to claim 2, wherein said actuating means comprises a pulse motor connected to said first air flow control valve means, and wherein said electrical unit comprises means for transforming said first signal from said sensing means into a pulsating signal and for transforming said second signal into another pulsating signal, which pulsating signals are transmitted to said pulse motor, so that valve member is slowly moved in said one direction for gradually decreasing the amount of air introduced into the exhaust system when said first pulsating signal is received, and that said valve member is slowly moved in said other direction for gradually increasing the amount of air introduced into the exhaust system when said second pulsating signal is received by said pulse motor.

5. An apparatus for introducing secondary air according to claim 1, wherein said operating means comprises:

an electrical actuating motor connected to said valve member of said second air flow control valve means to move said valve member in one direction to decrease the amount of air introduced into said first air flow control valve means and in another direction to increase the amount of air introduced into said second air flow control valve means;

a first air flow sensor for sensing the amount of engine fluid passed through the engine passageways including the intake system and the exhaust system;

a second air flow sensor for sensing the amount of air introduced into the first valve means, and;

an electrical unit connected to said first and second air flow sensors so as to provide one signal indicating that the ratio of the amount of engine fluid to the amount of air introduced into the first flow control valve means is larger than a predetermined constant ratio, and to provide another signal indicating that said ratio is smaller than the predetermined constant ratio, said valve member of said second air flow control valve means being moved, by said actuating motor, in said one direction to decrease the amount of air introduced into said first air flow control valve means when the first signal is received by said actuating means, said valve member being moved, by said actuating motor, in said other direction to increase the amount of air introduced into said first valve means when the second signal is received by said actuating means, whereby said ratio is kept near said predetermined constant ratio.

6. An apparatus for introducing secondary air according to claim 5, wherein said actuating motor comprises an electric motor connected to said electrical circuit and a rack and worm wheel mechanism connecting the electric motor to the valve member of said second air flow control valve means to be moved at a limited rate, so that the valve member is slowly moved in said one direction for gradually decreasing the amount of air introduced into said first air flow control valve means when said one signal indicates that the ratio is larger than the predetermined ratio, and that the valve member is slowly moved in said other direction for gradually increasing the amount of air introduced into said first air flow control valve means when said other signal indicates that the ratio is smaller than the predetermined ratio.

7. An apparatus for introducing secondary air according to claim 5, wherein said actuating motor comprises a pulse motor connected to said valve member of said second air flow control valve means, and wherein said electrical unit comprises means for transforming said one signal into a pulsating signal and for transforming said other signal into another pulsating signal, which pulsating signals are transmitted to said pulse motor, so that the valve member is slowly moved in said one direction for gradually decreasing the amount of air introduced into said first air flow control means when said one pulsating signal indicates that the ratio is larger that the predetermined ratio, and that the valve member is slowly moved in said other direction for gradually increasing the amount of air introduced into said first air flow control valve means when said other pulsating signal indicates that the ratio is smaller than the predetermined ratio.

8. An apparatus for introducing secondary air according to claim 1, wherein said operating means comprises a vacuum operated means connected to a vacuum port formed in the intake system of the engine, which vaccum operated means is adapted for moving said valve member to control an amount of air introduced into said first air flow control valve means in accordance the vacuum level at said port.

* * * * *